Sept. 29, 1936.  J. FRITSCHE  2,055,972
ELECTRIC BROILER AND COOKER
Filed Sept. 15, 1934
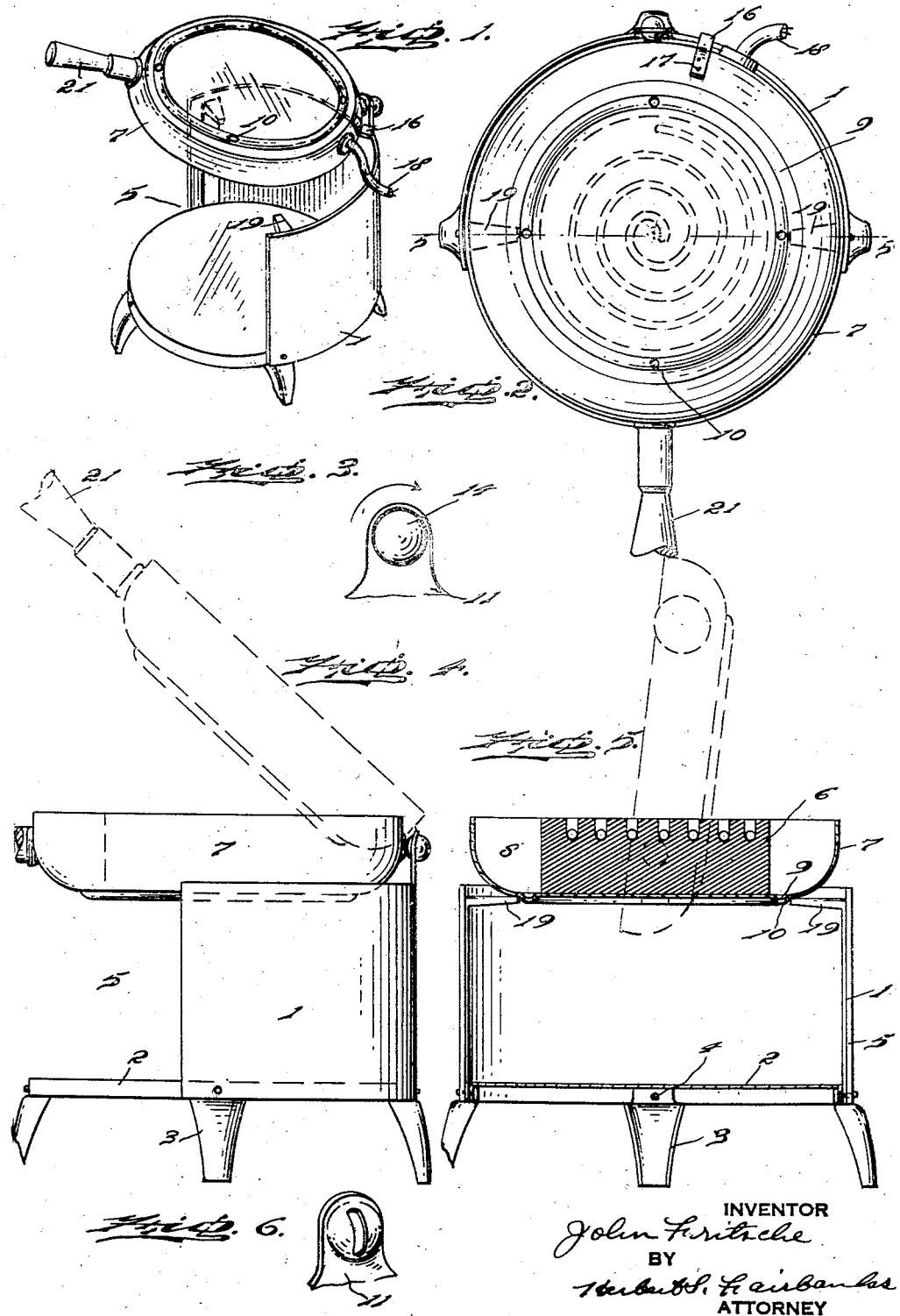
INVENTOR
John Fritsche
BY
Herbert S. Fairbanks
ATTORNEY Patented Sept. 29, 1936

2,055,972

UNITED STATES PATENT OFFICE 2,055,972

ELECTRIC BROILER AND COOKER

John Fritsche, Philadelphia, Pa.

Application September 15, 1934, Serial No. 744,140

3 Claims. (Cl. 219—37)

My invention relates to a novel construction and arrangement of an electric cooking appliance.

The object of the invention is to devise a novel electric stove which can be economically manufactured, and which can be employed for broiling or top cooking, at the will of the operator.

It further comprehends a novel construction and arrangement of a casing, a novel electric heating unit and novel means for movably connecting the heating unit with the casing.

Other novel features of construction and advantage will hereinafter clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a perspective view of an electric broiler and top cooker, embodying my invention.

Figure 2 is a top plan view with the electric heating unit in broiling position.

Figure 3 is a rear elevation, on an enlarged scale, showing more particularly the hinge arrangement for the heating unit.

Figure 4 is a side elevation, with the heating unit shown in dotted lines in its raised position so that it can be turned over to bring the heating unit in position for broiling.

Figure 5 is a sectional elevation, the section being taken substantially on line 5—5 of Figure 2.

Figure 6 is a detail of the hinge construction.

Similar numerals indicate corresponding parts.

Referring to the drawing:—

1 designates the casing of an electric broiler and top cooker embodying my invention.

The casing is provided with a closed bottom 2 having supporting legs 3 which space it from the support on which it is placed and provides an insulating air space. The casing and legs are secured to the bottom by fastening devices 4. The casing is open at the top, and its side wall is preferably formed of sheet metal which, as illustrated, extends a little more than one hundred and eighty degrees to provide an enlarged side opening 5 through which a cooking utensil can be inserted to rest on the bottom 2. The heating unit 6 is mounted in a revoluble cover in the form of a pan shaped casing 7 having a chamber 8 surrounding the heating unit and leading to an annular grove 9 having drainage openings 10 so that any overflow from a cooking utensil on top of the heating unit will not interfere with the heating unit and will drain through the openings 10.

The casing 1, at its rear end, has rising from it and fixed to it a hinge bracket 11 having a hemispherical depression 12 and a slot 13. The cover has fixed to it a ball 14 to seat in the opening 12 and a shank 15 to extend through the slot 13. An L shaped stop 16 is secured to the cover 7 by fastening devices 17, so that when the heating unit is directed downwardly the operator will not turn the cover in the wrong direction.

18 is the electric conductor which connects the heating unit with a source of electric supply.

I provide a plurality of supports 19, two of such supports being illustrated and as they are of the same construction, a description of only one of them is deemed necessary.

Each support 19 is preferably formed of sheet material deflected laterally and rounded at its upper end to form a rest for the cover. The lower end of each support is secured to the casing 1 and the bottom 2 by one of the fastening devices 4. Each support is also fastened to the casing 1 by rivets or other fastening means 20. The cover is provided with a grasping handle 21.

Assuming now that the cover has its open portion directed upwardly as in Figure 5 the cooking utensil is placed above it for top cooking.

If it is desired to broil steaks or chops, or to brown the upper portion of puddings, cakes, pies or other articles of food, or for toasting, the cover is raised into the position seen in dotted lines in Figure 4, so that it will clear the supports 19 when being turned to direct the heat from the heating unit downwardly. The stop 16 prevents the turning of the cover in a direction to permit the conductor 18 to catch on or be moved within the casing 1.

The heating coils of the heating unit are preferably exposed and placed in a helical groove of the ceramic material ordinarily employed in the making of a heating unit of the character illustrated.

It has been found in practice that an electric broiler and top cooker as herein disclosed, can be very economically manufactured as the parts of the casing can be readily stamped from sheet material, as well as the pan shaped cover.

It will now be apparent that I have devised a new and useful electric broiler and top cooker which embody the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent is:—

1. In an electric broiler and top cooker, a casing open at its top and having its side wall closed except for an opening for the insertion and removal of a cooking utensil, a heating grid having means to direct its heat in one direction and having at one end a ball and socket connection with said casing, means to retain said grid in position for broiling or top cooking, and means to prevent improper rotation of said grid.

2. In an electric broiler and top cooker, a base, a semicircular wall rising from said base, having at its rear upper portion an upwardly extending bracket member having a hemispherical depression in its front face and a slot through the wall of such depression, a uni-directional heating unit having a ball to seat in said depression and a shank extending from the ball to pass into said slot, and means extending inwardly from said wall to support the forward portion of said unit.

3. In an electric broiler and top cooker, a base, a semicircular wall rising from said base having at its upper rear portion an upwardly extending bracket member having a hemispherical depression and a slot through the depression, a pan shaped cover having a ball to seat in said depression and a shank extending from the ball to enter said slot, and an electric heating unit disposed within said cover and having a chamber surrounding it, and the bottom of said chamber having drainage openings.

JOHN FRITSCHE.